(12) United States Patent
Gregerson et al.

(10) Patent No.: US 8,496,178 B2
(45) Date of Patent: Jul. 30, 2013

(54) METHOD AND APPARATUS FOR PROVIDING CUSTOMER SIDE IMAGING AS WELL AS BAR CODE SCANNING IMAGING

(75) Inventors: David Lee Gregerson, Lawrenceville, GA (US); Donald A. Collins, Jr., Buford, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 13/222,003

(22) Filed: Aug. 31, 2011

(65) Prior Publication Data

US 2013/0048732 A1 Feb. 28, 2013

(51) Int. Cl.
*G06K 7/10* (2006.01)

(52) U.S. Cl.
USPC ............ 235/462.32; 235/462.31; 235/462.43; 235/462.11; 235/462.41

(58) Field of Classification Search
USPC .......... 235/383, 454, 462.01, 462.31, 462.32, 235/462.36, 462.38, 462.43, 462.11, 462.41
See application file for complete search history.

(56) References Cited

U.S. PATENT DOCUMENTS

| | | | | |
|---|---|---|---|---|
| 5,073,702 A * | 12/1991 | Schuhmacher | ........... | 235/462.22 |
| 5,095,203 A * | 3/1992 | Sato et al. | ................. | 250/222.1 |
| 6,427,915 B1 * | 8/2002 | Wike et al. | ..................... | 235/383 |
| 6,854,655 B2 * | 2/2005 | Barkan | ........ | 235/462.4 |
| 6,974,083 B1 * | 12/2005 | Kahn et al. | ................ | 235/462.14 |
| 2001/0019104 A1 * | 9/2001 | Ohkawa et al. | ................ | 250/234 |
| 2003/0132291 A1 * | 7/2003 | Schmidt et al. | ................ | 235/383 |
| 2003/0201326 A1 * | 10/2003 | Bobba et al. | ............. | 235/462.14 |
| 2005/0116031 A1 * | 6/2005 | Schmidt et al. | ................ | 235/383 |
| 2006/0038009 A1 * | 2/2006 | Russell et al. | ................ | 235/383 |
| 2007/0290043 A1 * | 12/2007 | Russell et al. | ........... | 235/462.14 |
| 2009/0101718 A1 * | 4/2009 | Knowles et al. | ......... | 235/462.42 |
| 2010/0270376 A1 * | 10/2010 | McQueen | ................ | 235/462.11 |
| 2011/0309147 A1 * | 12/2011 | Barkan et al. | ................. | 235/440 |

* cited by examiner

*Primary Examiner* — Daniel Hess
*Assistant Examiner* — Paultep Savusdiphol
(74) *Attorney, Agent, or Firm* — Peter H. Priest; Harden E. Steven, III

(57) ABSTRACT

Systems and techniques for image based bar code scanning. A rotating spinner is positioned to reflect images to an imaging device within the scanner so that a field of view of the scanner encompasses images reflected by the spinner to the imaging device. The rotation of the spinner causes the field of view of the scanner to change. Mirrors positioned and oriented to reflect images to the spinner and from the spinner to the imaging device further shift the field of view of the scanner as the rotating spinner causes images reflected from different mirrors to be delivered to the imaging device so that both cashier and customer side imaging sensing may be employed. The image field may be automatically shifted from cashier side imaging to customer side imaging, shifted based on detection of customer presentation of an item in a customer presentation window field of view, or manually shifted by a cashier.

11 Claims, 7 Drawing Sheets

FIG. 5C
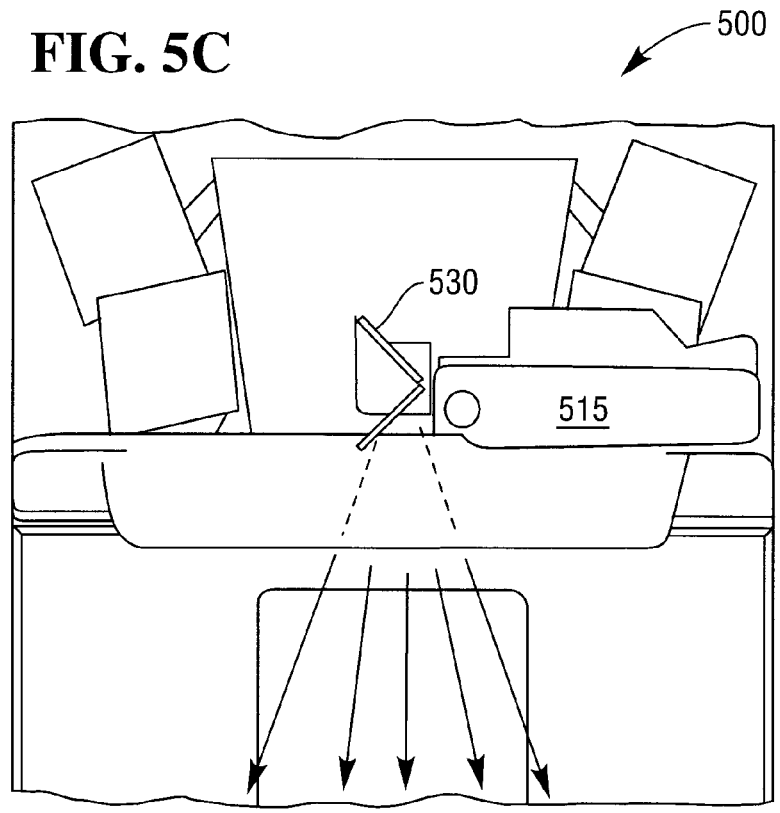
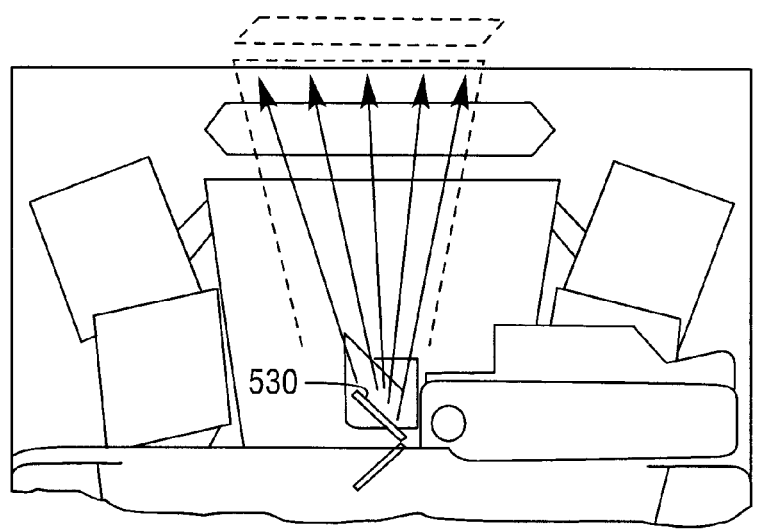
FIG. 5D

METHOD AND APPARATUS FOR PROVIDING CUSTOMER SIDE IMAGING AS WELL AS BAR CODE SCANNING IMAGING

FIELD OF THE INVENTION

The present invention relates generally to improvements in bar code scanning, and more particularly to improved methods and apparatus for providing both cashier and customer side imaging.

BACKGROUND OF THE INVENTION

Image based bar code scanning is a known technique. See, for example, U.S. patent application Ser. No. 12/342,792, filed Dec. 23, 2008, published as U.S. Patent Application Publication No. 2010/0155484, assigned to the assignee of the present application and incorporated by reference herein in its entirety. Such approaches provide valuable techniques for obtaining images of bar codes on items at checkout at grocery, retail stores and the like. However, the imager employed typically obtains images from the cashier side of a checkout stand and not from the customer side. Thus, if a customer has a bar coded loyalty card, the customer hands the card to the store checkout person or cashier who scans it and then returns it to the customer.

Another and different aspect of checkout is that shoppers often place large or bulky items, such as a large bag of dog food, kitty litter, potatoes, a twelve pack of soda or the like on the bottom rack of the traditional shopping cart which is designed to support such items. However, when checking out customers rapidly, the bottom of the cart items can be missed, or alternatively may require a time consuming process to be scanned. As one alternative, the large bulky items must be boosted to the checkout surface and scanned. As another alternative, the service person may need to come around the customer side and scan the item or items with a handheld scanner.

It is also known to capture a video feed of the vicinity of a checkout station. See, for example, U.S. patent application Ser. No. 11/835,578, filed Aug. 8, 2007, published as U.S. Patent Application Publication No. 2009/0039165, assigned to the assignee of the present application and incorporated by reference herein in its entirety. This approach employs a separate camera to capture the video feed.

SUMMARY OF THE INVENTION

Among its several aspects, the present invention recognizes that situations like those described above can be handled more efficiently without adding a significant amount of new imaging hardware by adapting existing bar code imaging optics to also perform a customer side imaging function or functions.

As an example, more and more cell phone users are employing applications to scan customer loyalty codes into their cell phones so that when they want to use the loyalty code, they simply select an icon on the phone and a corresponding bar code is displayed, thereby eliminating the need to carry a key ring or wallet full of loyalty cards. However, unlike a key ring or card which the customer feels comfortable handing to a checkout clerk, the customer may not want other people handling his or her phone for a wide variety of reasons ranging from personal hygiene related to personal privacy concerns, and the like. One aspect of the present invention allows the customer to maintain control of the phone while presenting a displayed bar code for scanning on the customer side as addressed further below. Further, in another aspect of the invention, customer presentation of a cell phone, license, a coupon, or the like, may be automatically sensed, and bar code imaging optics may be automatically switched from cashier side to customer side as addressed further herein.

As a further example, a customer may be requested to produce a valid identification, such as a driver's license, to purchase products such as tobacco products or alcoholic beverages. Also, a driver's license may be requested in connection with the use of a credit card, debit card or the like. An aspect of the present invention allows the customer to present identification on the customer side.

As a further example, another aspect of the present invention allows a video image from the customer side, such as video of any bulky articles on the bottom shelf of a grocery cart, to be displayed on a checkout display so the checkout person does not inadvertently miss such items. Recognition software can suitably analyze such video and the display can be flashed, highlighted or the checkout person's attention can otherwise be directed thereto.

A more complete understanding of the present invention, as well as further features and advantages of the invention, will be apparent from the following Detailed Description and the accompanying drawings.

BRIEF DESCRIPTION OF THE DRAWINGS

FIGS. 5A-5D illustrate aspects of an automatic sensing embodiment for changeover from cashier side imaging to customer side imaging in accordance with the present amendment;

DETAILED DESCRIPTION

Figure 1:
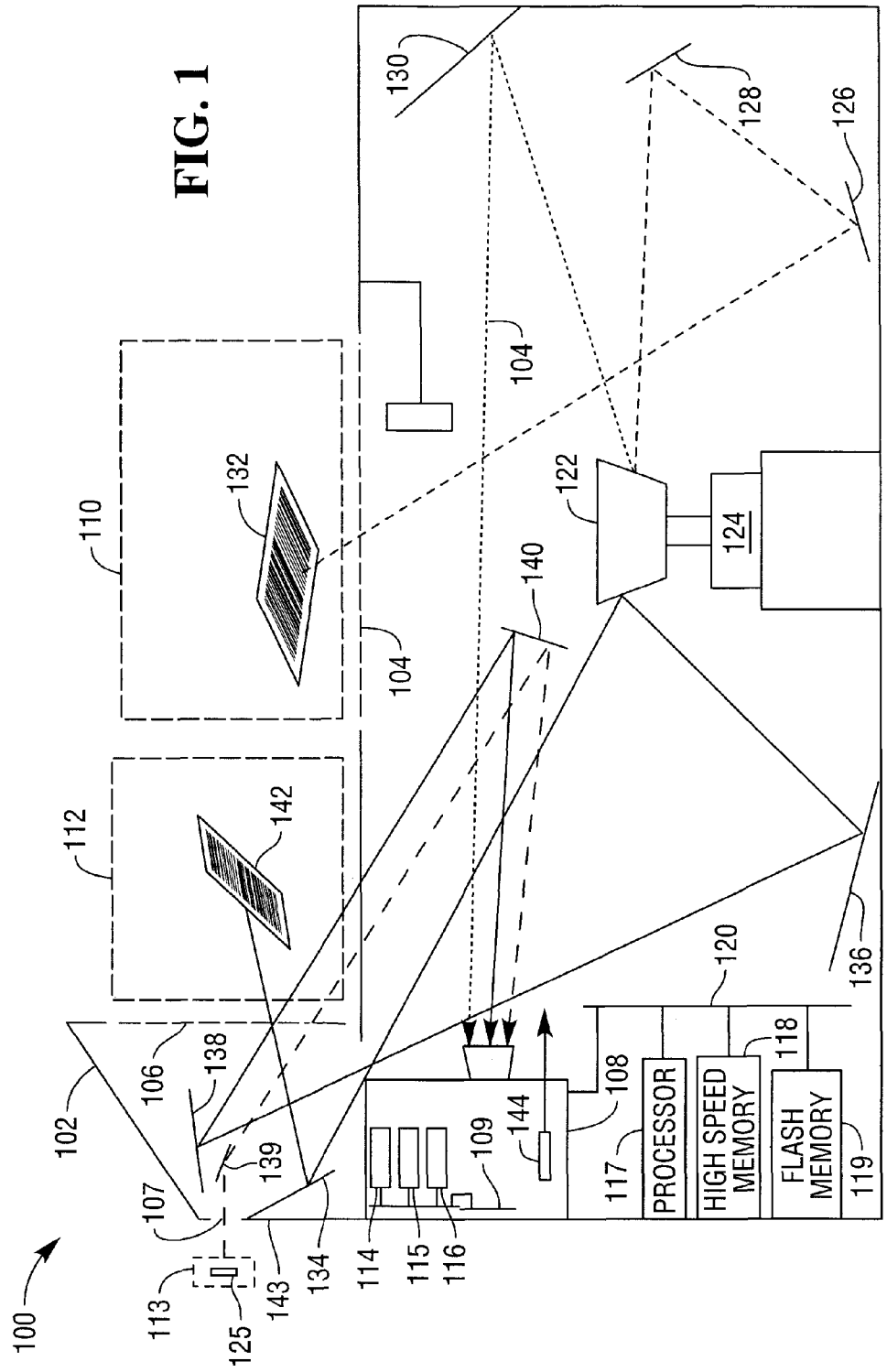
FIG. 1 illustrates an imaging bar code scanner providing both cashier side and customer side fields of view in accordance with the present invention.

FIG. 1 illustrates an embodiment of an image based bar code scanner 100 according to an aspect of the present invention. The scanner 100 includes a housing 102, horizontal and vertical scan windows 104 and 106 for cashier side imaging, and an imaging device 108. The imaging device 108 uses an imaging element 109 to capture digital images of objects placed within either of horizontal or vertical scan volumes 110 and 112, respectively. These images may be processed by data processing elements in the imaging device 108, such as a processor 114, memory 115, and storage 116. Scanner 100 further includes a processor 117, memory 118, and long term storage such as flash memory 119, communicating with one another and with the imaging device 108 over a bus 120. Images from scan volumes 110 and 112 may be captured and processed to extract bar code information according to techniques known in the art. These images are referred to herein as checker or cashier side images.

Additionally, an image through a customer side scan window 107 (also referred to as customer presentation window) for a further scan volume 113, is also captured by imaging element 109. This image is referred to here as a customer side image. The customer side image will typically be of a customer identification card, a loyalty card, a barcode displayed on a cell phone display, or the like, collectively, customer item 121.

In order to provide for increased operator convenience and efficiency, as well as flexibility and economy in scanner design, the scanner 100 includes optical elements to direct images of bar codes to the scanner along desired pathways, with these pathways being changed in predetermined ways. Such use of optical elements allows for an increase in the size of the scan volumes 110 and 112 in which positioning of a bar code for an effective scan can be performed. Additionally, optical elements collect an image from scan volume 113. This use of optical elements allows for economy in the use of imaging devices, because one imaging device 108 can be used to capture images of bar codes presented at either of the scan windows 104 or 106, as well as, the customer item 121 presented at the customer presentation window 107, and also allows for flexibility in scanner design. Rather than placing an imaging device such as the imaging device 108 to have a direct view of a scan window such as the scan window 104, an imaging device can be placed at any location to which it is suitable to direct an image through the placement of optical elements. The optical elements include a rotating spinner 122, rotated by a motor 124.

The scanner 100 further includes a sequence of fixed mirrors 126, 128, and 130. In the present example, the fixed mirror 126 receives a reflection from a bar code 132 positioned in the scan volume 110, and directs the reflection to the spinner 122. The spinner in turn directs the reflection along the sequence of mirrors 128 and 130, so that the reflection is directed to the imaging device 108. The spinner 122 suitably has four differently angled facets, so that the facets reflect incident light at different angles. As the spinner 122 rotates, the position of each facet changes, so that the field of view encompassed by the facet changes. In addition, the angle of incidence of light striking the spinner 122 changes, so that light originating from the same point strikes and leaves the facet at a constantly changing angle. The effect of the rotation of the spinner 122 is therefore to capture and reflect light, and therefore images of objects from which the light is reflected, from different origins, and to present images which translate through space with the rotation of the spinner. An image of the bar code 132 will therefore come into the field of view of the spinner 122 and will move along a pathway that takes it into the field of view of the imaging device 108, and this will occur for numerous positions and orientations of the bar code 132 in the scan volume 110.

Similarly, the scanner 100 includes a sequence of mirrors 134, 136, 138, 140 providing one pathway for reflection of an image entering the scan window 106. An image of the bar code 142 enters the scan window 106, and is directed from the mirror 134, to the spinner 122, to the mirrors 136, 138, and 140, and to the imaging device 108. The reflected image of the bar code 142 is translated by the rotation of the spinner 122 so that it is directed to the imaging device 108 at some point during the rotation of the spinner 122.

The movement of the field of view, and shifts between different fields of view, may be relatively rapid, so as to quickly encompass many different locations in the scan zones 110 and 112. Therefore, the bar code 132 or the bar code 142, if held in approximately one position, may be in the field of view of the scanner for only a relatively short time during each rotation of the spinner 122. For this reason, the processing elements of the scanner 100, such as the imaging element 109, processor 114, memory 115, and storage 116, and the processor 117, memory 118, and storage 119, are suitably chosen so as to operate at a high speed to allow for rapid image capture and processing and, if desired, to allow for numerous rapid captures of an image as the spinner 122 rotates repeatedly through the same rotational position.

The scanner 100 also includes a sequence of mirrors, 139, 140, which directs an image from scan volume 113, entering through customer presentation window 107 in face 143 of the housing 102 to the imaging device 108. It will be recognized that while a very simple image collecting optical arrangement is illustrated in FIG. 1 for collecting images from scan volume 113 that other more complex arrangements may be suitably employed particularly where a larger or different scan volume is to be dealt with as addressed further below. The imaging device 108 may also suitably include an illuminator 144, which illuminates the scan volumes 110, 112 and 113. The illuminator 144 may emit infrared or visible light, and is suitably positioned and oriented to provide on-axis illumination. On-axis illumination is less irritating to an operator or customer but can be expected to introduce reflection and noise. The imaging device 108 therefore suitably includes appropriate optical or digital filtering and compensation, and the data processing elements of the scanner 100 are suitably programmed so as to reduce or eliminate noise and other effects introduced by such illumination that tend to degrade imaging accuracy and the efficiency of decoding. The illuminator 144 directs an illumination beam 146 out of the imaging device 108 in the opposite direction from incoming light rays. The path of the illumination beam 146 is directed by the spinner 122 and the fixed mirrors so that it illuminates the field of view of the scanner 100 at any particular time. For example, when the spinner 122 is positioned so that an image of the bar code 142 is directed to the imaging device 108, the positioning of the spinner also serves to direct the illumination beam to illuminate the bar code 142.

Figure 2:
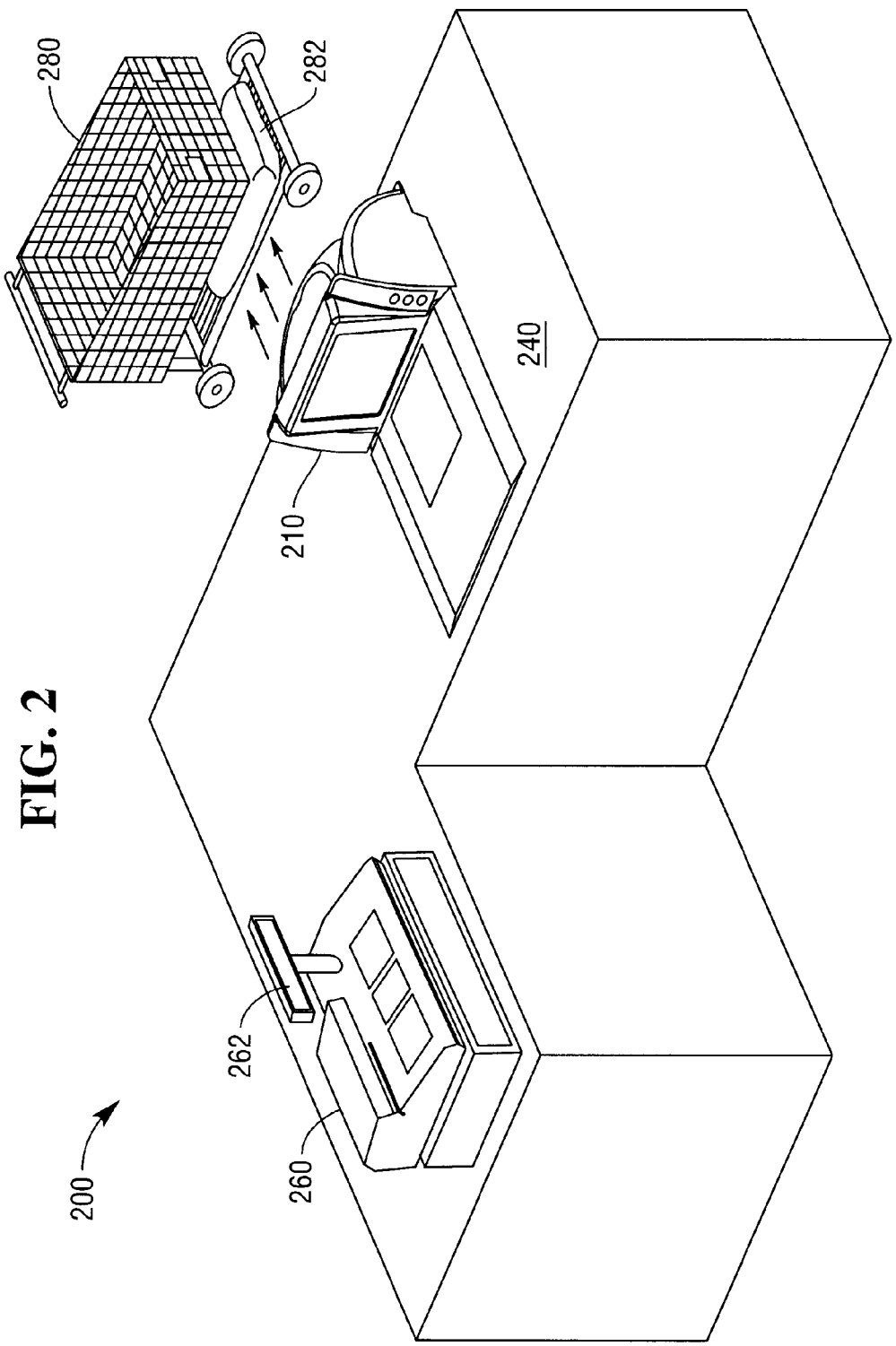
FIG. 2 illustrates an imaging bar code scanner, such as the scanner of FIG. 1 employed to detect items on a bottom shelf of a shopping cart.

FIG. 2 illustrates a checkout system 200 including a scanner and scale unit 210 integrated into a checkout stand 240 where the scanner 210 is utilized in conjunction with a point of sale terminal 260 by a cashier to checkout a customer's purchases such as groceries and the like which are brought to the checkout stand, for example, in a cart, such as illustrated 280. The checkout system 200 is used in a typical manner in which the cashier or the customer places items to be purchased on a top surface of checkout stand 240. The cashier scans barcodes on the items by passing them through the scan zones of the scanner 210, and places them on a conveyer that takes the scanned items to a bagging area. This conveyer and bagging portions of checkout stand 240 are shown partly cutaway so as not to block the view of the bottom of cart 280.

Unlike typical prior art checkout systems, in checkout system 200, the imaging system of scanner and scale unit 210 also captures an image of the bottom of cart 280 utilizing a single optical system. The image of the bottom of the cart can be fed to cashier display 262 of the POS terminal 260. Further details of such operation are discussed below in connection with FIGS. 3 and 4. Additionally, if the customer wishes to present a coupon or loyalty code loaded on a cell phone, a driver's license for identification or the like, the imaging system of the scanner and scale unit 210 may be manually switched from cashier side for scanning of items to be purchased to the customer side as shown in FIG. 3 or automatically switched as discussed in connection with FIGS. 5A-5D and FIG. 6.

Figure 3:
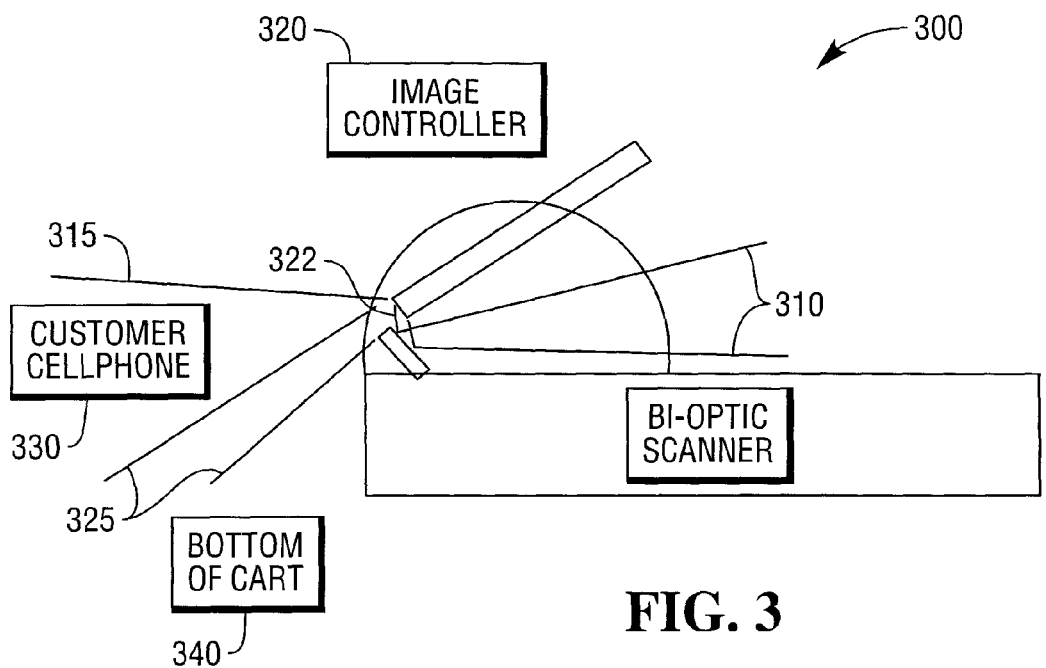
FIG. 3 illustrates a manual arrangement for a cashier to change the field of view of an imaging barcode scanner in accordance with the present invention.

Turning to FIG. 3, this figure shows a block diagram of a bi-optic scanner 300 which may suitably be implemented by either of the scanners 100 or 200, respectively. In FIG. 3, barcode imaging lines 310 are shown for a cashier side vertical field of view. A mechanical image controller 320 is utilized by a cashier to change from the cashier side vertical field of view to either a near customer field of view where imaging lines represented by line 315 in FIG. 3 sense customer presentation of an item, such as customer cell phone 330, or lines 325 obtain image data for a far customer field of view, such as bottom of cart 340. In FIG. 3, mechanical image controller 310 is illustrated as a rotatable lever arm which controls positioning of a mirror face 322 to allow a cashier to manually change the field of view. An illuminator, such as illuminator 144 of FIG. 1 may be employed to provide the cashier with an imaging guide. It will be apparent to those of ordinary skill in the art that a circular rotatable handle or a wide range of other mechanical arrangements may be suitably used as an alternative thereto. Additionally, a cashier operated switch could suitably be employed, or as described in connection with FIGS. 5A-5D and FIG. 6, an automatic field of view switching arrangement may be advantageously employed.

Figure 4:
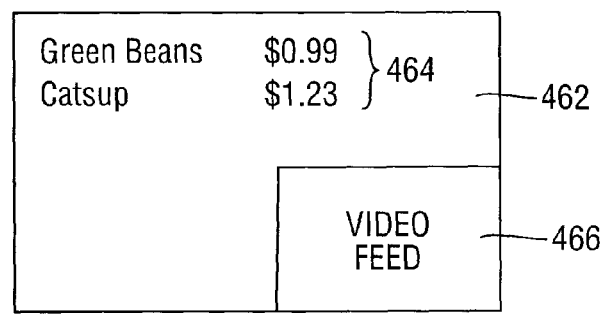
FIG. 4 illustrates video feed displayed on a cashier display captured by the imaging barcode scanner of FIG. 3, for example.

Turning to FIG. 4, an exemplary cashier LCD display 462 is shown in which items purchased and their prices 464 are displayed in a normal manner along with video feed 466 from either the near customer field of view for customer cellphone 330 of FIG. 3 or the far customer field of view for bottom of cart 340 of FIG. 3. This video feed 466 can advantageously be flashing to draw cashier attention or highlighted in an eye catching color such as red, for example. In this way, the cashier is much less likely to miss an item on the bottom of the cart or fail to check a customer identification.

Figure 5A:
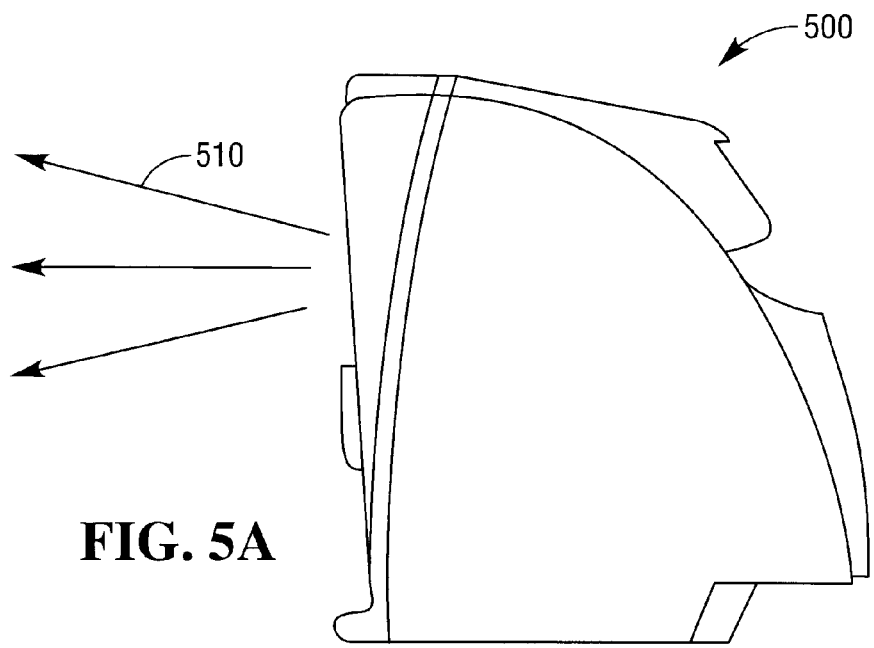
Figure 5B:
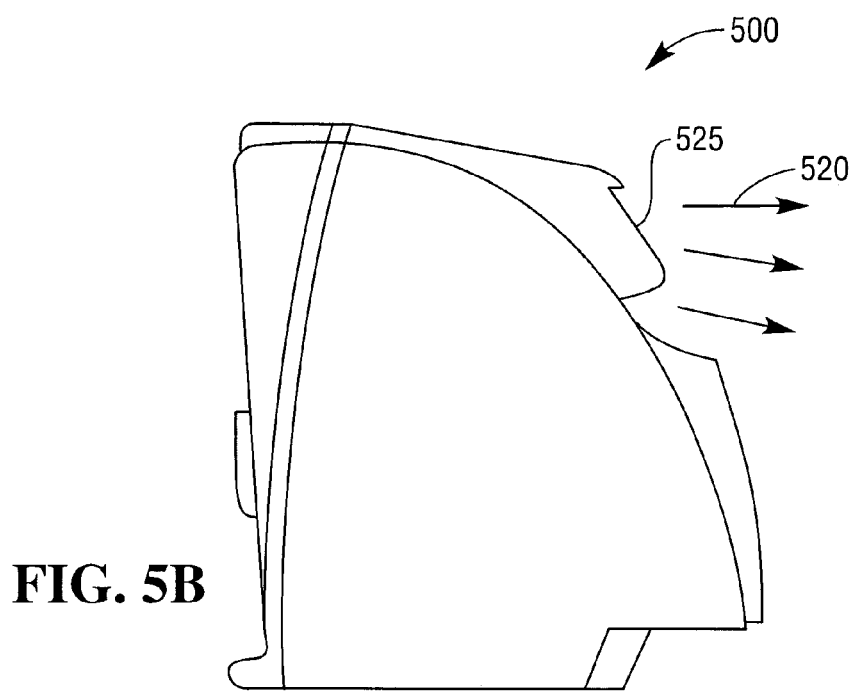
Figure 6:
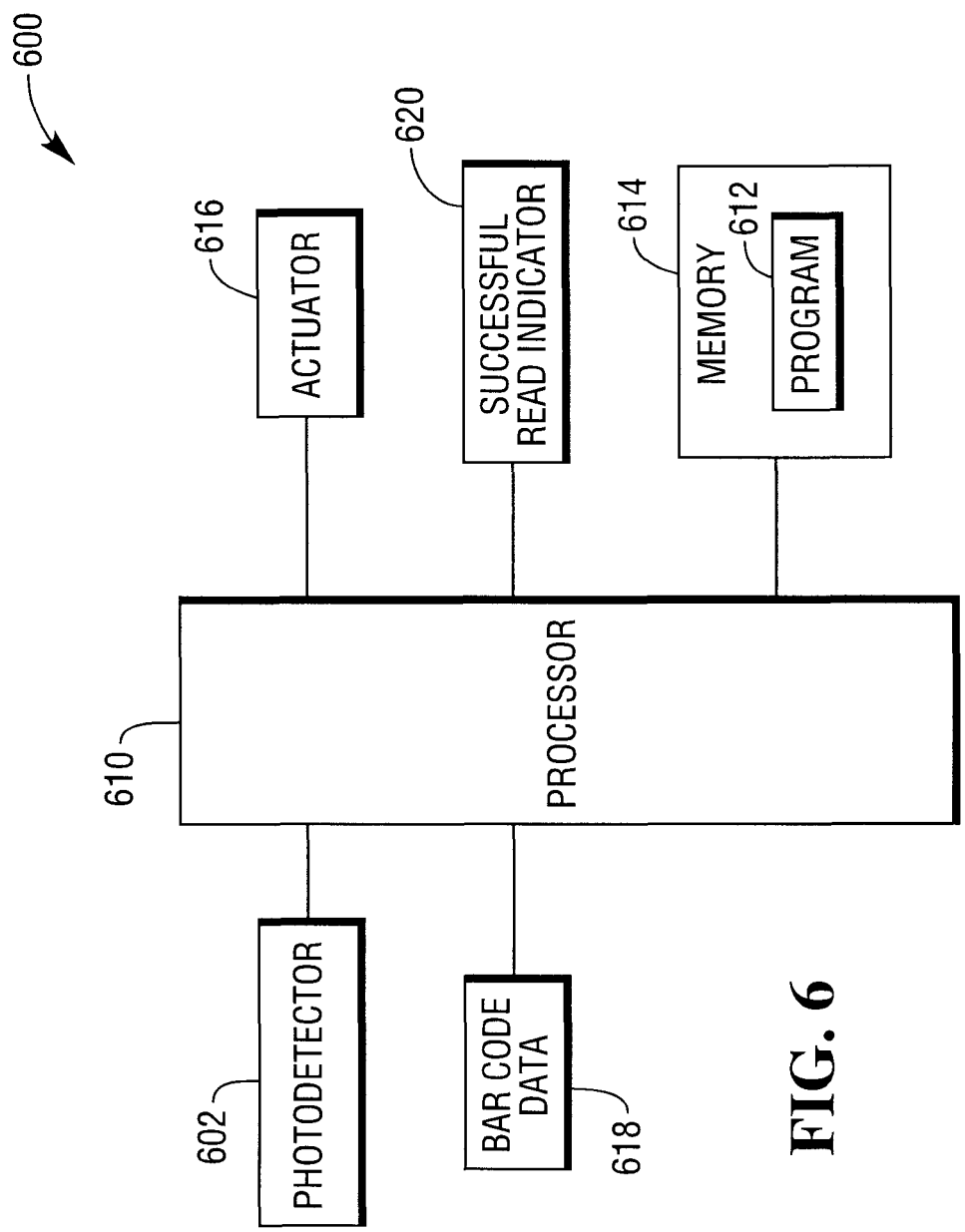
FIG. 6 illustrates a control circuit arrangement for use in connection with the embodiment of FIGS. 5A-5D.

As shown in FIGS. 5A-5D and 6, among its several aspects, the present invention recognizes that it may be advantageous to provide an automatic arrangement for switching from a cashier field of view 510 for a fixed imager 515 (FIG. 5E) for scanner 500 as illustrated in FIG. 5A to a customer side field of view 520 as illustrated in FIG. 5B. To this end, a photodetector which may suitably comprise one or more photodiodes, such as photodetector 602 of FIG. 6, is built into the scanner 500. When a customer presents a cell phone, a coupon, an identification card or the like, this presented item tends to reduce the light reaching the photodiode 602. In one embodiment, the customer presents a bar coded item, such as a coupon, by placing it directly against a customer presentation window 525 seen in FIG. 5B. When the light level falls below a predetermined threshold, a level change is detected, for example, by programmed microprocessor 610 of control circuit 600 of FIG. 6. Under control of a program, such as program 612 stored in memory 614 of FIG. 6, the microprocessor 610 controls an automatic switch from cashier field of view to customer side field of view 520 of FIG. 5B.

As one example, microprocessor 610 drives an actuator 616, such as a small motor or solenoid to move a mirror arrangement 530 from a first position illustrated in FIG. 5C to a second position illustrated in FIG. 5D. This movement can be a simple linear movement as shown in FIGS. 5C and 5D or a rotational movement not shown.

Upon successful reading of a barcode, a green LED or other indicator, such as an aural indicator, can be controllably driven by the processor 600 to provide the customer with feedback that the item has been successfully presented and can now be put away.

Among its several advantages, the approach of FIGS. 5A-5D and 6 has the advantage that no cashier training is required and no control buttons need to be added to the scanner 500.

Turning to FIG. 6, an illustrative control circuit 600 is shown for use in conjunction with the scanner 500 of FIG. 5. Control circuit 600 includes a programmed processor 610 having a program 612 comprising a sequence of software instructions stored in memory 614. The processor 610 receives as an input, the output of the photodetector 602. Upon detecting a drop in illumination as a result of the customer positioning an item such as a cell phone next to customer presentation window 525 of FIG. 5B, the processor drives an actuator 616 to automatically control a change of the field of view. Optionally, upon successful read of bar code data 618, such as a barcode displayed on the display of the cell phone, processor 610 may drive a successful read indicator 620, such as a green LED, letting the customer know the phone can now be removed. The processor 600 also drives the actuator 616 to return the imager to the cashier field of view.

Figure 7:
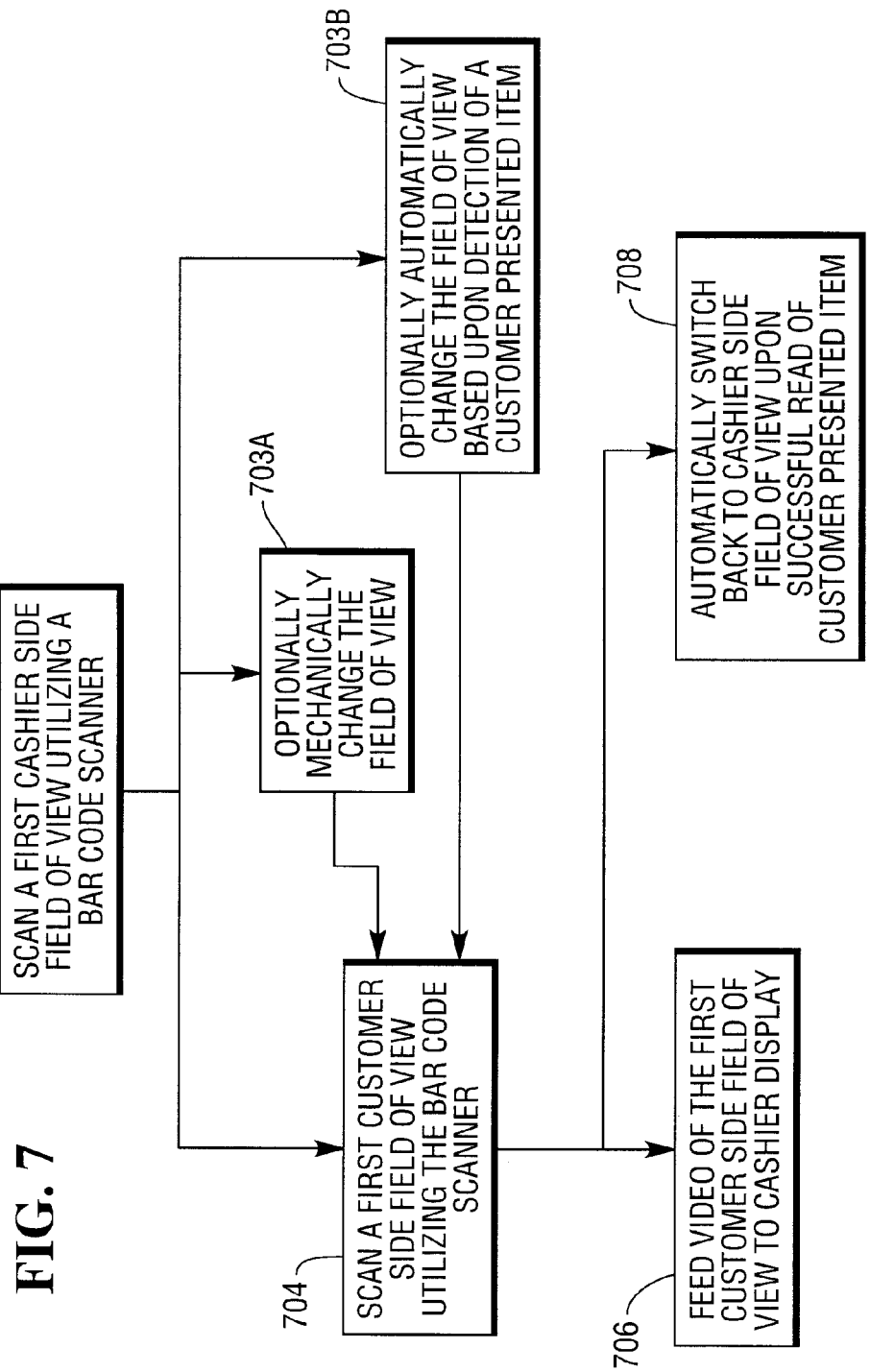
FIG. 7 illustrates a process of cashier and customer imaging in accordance with the present invention.

FIG. 7 illustrates a process 700 in accordance with the present invention. In step 702, a bar code scanner scans a first cashier side field of view. In step 704, the bar code scanner proceeds to scan a first customer side field of view. While this process may proceed directly as in FIG. 1 as a result of rotation of mirrored spinner 122 and the other optical elements, in an optional step 703A, the process proceeds as a result of a mechanical adjustment by the cashier as addressed in connection with FIG. 3. In an optional step 703B, the process proceeds as a result of an automatic optical adjustment triggered by detection of a customer presenting an item at a customer presentation window as addressed in connection with FIGS. 5A-5D and FIG. 6.

Where the field of view is a bottom of the cart field of view, for example, in step 706, video thereof may be suitably fed to a cashier display device, such as the display of a point of sale terminal like display 262 of the terminal 260.

Where the field of view is of a volume adjacent the customer presentation window, in step 708, where a bar code from a display of a cell phone, for example, is successfully read, an automatic switch back to a cashier field of view occurs.

While the present invention is disclosed in the context of a presently preferred embodiment, it will be recognized that a wide variety of implementations may be employed by persons of ordinary skill in the art consistent with the above discussion and the claims which follow below.

We claim:

1. An image based bar code scanner having a cashier side and a customer side, the image based bar code scanner comprising:

an imaging device for capturing an image of a bar code presented by a cashier within a cashier field of view on the cashier side;

a rotating multifaceted mirrored spinner for reflecting an image of the bar code, with the rotating spinner being positioned and oriented such that a field of view of the scanner encompasses images of the bar code reflected by the spinner to the imaging device and such that the rotation of the mirror acts to provide the imaging device with a changing field of view, wherein the field of view of the scanner is changed to a customer side field of view and the imaging device then captures an image from the customer side.

2. The image based scanner of claim 1, further comprising one or more sets of fixed mirrors positioned and oriented such the fields of view of the imaging device are positioned and oriented such that the rotation of the spinner causes the field of view of the scanner to shift between a vertical scan window and a horizontal scan window on the cashier side.

3. The image based bar code scanner of claim 1, further comprising an illuminator directing an illumination beam such that the beam is reflected from the spinner to illuminate the field of view of the scanner.

4. The image based bar code scanner of claim 1 further comprising:
   a customer presentation window; and
   a detector to detect an item presented by a customer at the customer presentation window.

5. The image based bar code scanner of claim 4 further comprising:
   an actuator to move a mirror arrangement; and
   a controller to drive the actuator in response to detection of the item presented by the customer to switch the field of view to the customer side.

6. The image based bar code scanner of claim 1 wherein the customer side field of view includes a bottom of a customer cart on the customer side.

7. The image based bar code scanner of claim 6 wherein the imaging device captures video of the bottom of the customer cart and provides that video to a cashier display.

8. The image based bar code scanner of claim 1 further comprising:
   a cashier actuated mechanical actuator for manually switching from the cashier field of view to the customer side field of view.

9. A method of image based bar code scanning utilizing a bar code scanner comprising the steps of:
   activating a rotating mirrored spinner so that a field of view of the bar code image scanner encompasses images of a first bar code reflected by the spinner to the imaging device, the bar code being presented by a cashier on a cashier side of the bar code scanner; and
   changing the field of view of the bar code image scanner to encompass a second bar code presented by a customer at a customer presentation window on the customer side.

10. The method of claim 9, wherein the cashier field of view of the bar code image scanner shifts with the rotation of the spinner between a horizontal scan window and a vertical scan window.

11. The method of claim 9, further comprising directing an illumination beam such that the beam is reflected from the rotating spinner so as to illuminate the fields of view of the bar code image scanner.

* * * * *